United States Patent [19]
Soong

[11] 3,874,701
[45] Apr. 1, 1975

[54] HANDLEBAR FASTENING DEVICE FOR A TWO-WHEEL BICYCLE

[76] Inventor: William E. Soong, 18 W. 282 71st St., Westmont, Ill. 60559

[22] Filed: Dec. 6, 1973

[21] Appl. No.: 422,557

[52] U.S. Cl................. 280/278, 280/279, 403/374, 403/409
[51] Int. Cl............................................. B62k 21/24
[58] Field of Search ........... 280/278, 279; 403/374, 403/314, 361, 376, 409

[56] References Cited
UNITED STATES PATENTS
3,787,126  1/1974  Arlen................................. 280/279
FOREIGN PATENTS OR APPLICATIONS
616,126  1/1949  United Kingdom ............... 403/374
1,680,568  9/1971  Germany ........................... 403/374

Primary Examiner—Kenneth H. Betts
Attorney, Agent, or Firm—Marden S. Gordon

[57] ABSTRACT

A hand operated fastening device for removably securing handle bars to a bicycle in connection with the front steering wheel thereof permitting ease of removal of the handle bars without requiring tools or the like for ease of transportation and storage of the bicycle, the device including a rectangularly elongated head member having a semi-circular top surface interconnecting the end portions thereof and having a shank projecting outwardly of the rectangular portion to be threadedly joined in a conventional wedge assembly for securing the handle bars to the steering fork post of the bicycle, the head portion of the bolt being readily grasped in the hand of an individual to effect tightening and loosening rotative movement thereto about its longitudinal axis.

4 Claims, 4 Drawing Figures

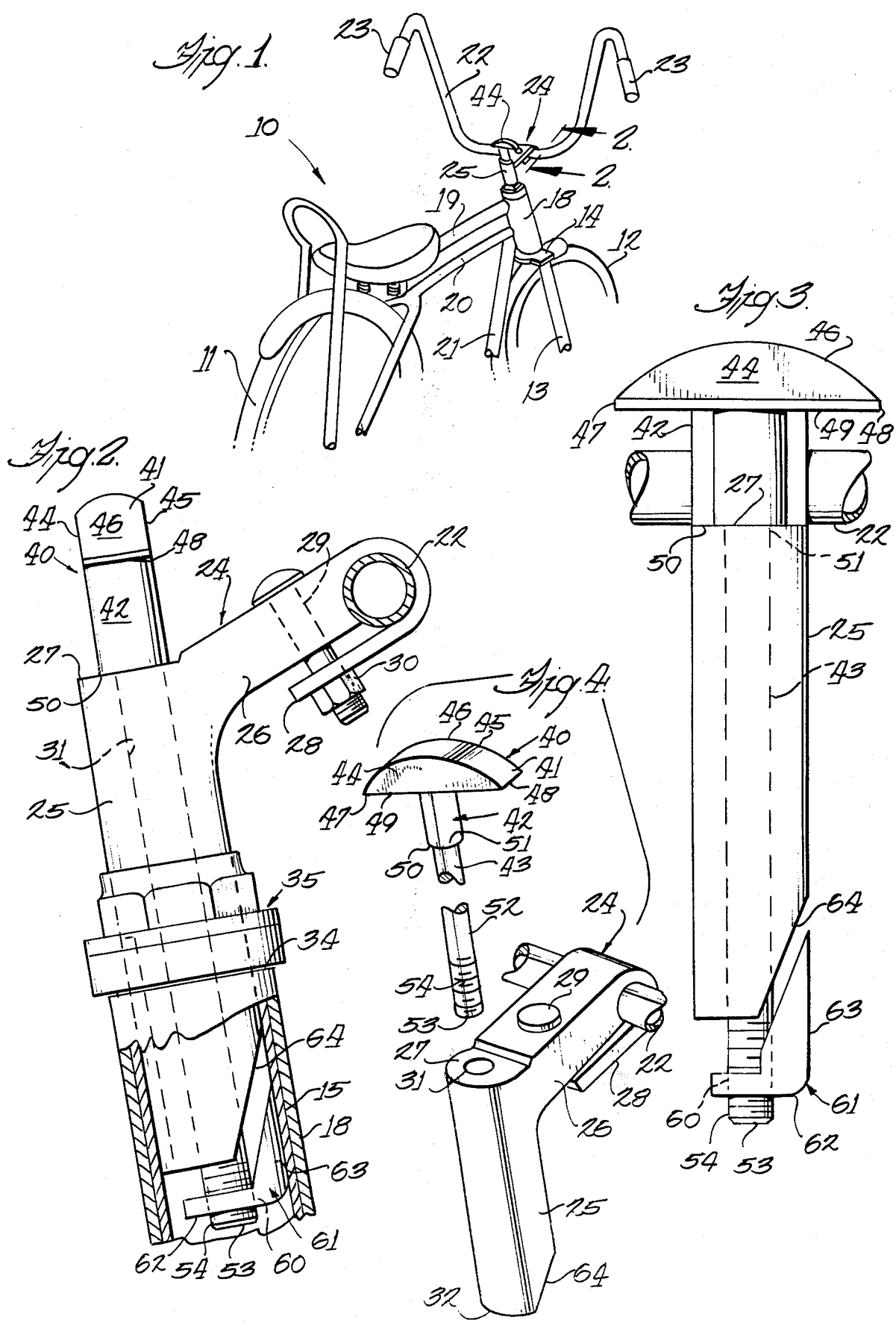

HANDLEBAR FASTENING DEVICE FOR A TWO-WHEEL BICYCLE

BACKGROUND OF THE INVENTION

1. Field of the Invention

This invention relates generally to bicycles and more particularly to a novel fastening device for releasably securing handle bars to the bicycle in a manner permitting ease of removal of the handle bars from the bicycle to provide for the storage and transportation of the bicycle.

2. Description of the Prior Art

Two-wheel type bicycles have long been known in the art, with it being conventional to secure the handle bars to the steering wheel of the bicycle in a permanent manner requiring a wrench or other similar type tool for turning the bolt securing the handle bars in a manner to tighten or loosen the bolt for insertion or removing the handle bars from the bicycle. This provides many disadvantages in that in the transportation and storage of the bicycle, it would be convenient to be able to readily remove the handle bars from the bicycle. Alternatively, it would be convenient in such storage and transportation to be able to move the handle bars sideways into alignment with the steering wheel rather than the handle bar normal position as projecting transversely outwardly of the plane of the steering wheel. To perform this at the present time, it is required that a wrench or other tool be used each time to loosen the holding bolt, this being disastrous if it is desired to use the bicycle and such a wrench or tool is not readily available. Further, use of a wrench or such tool constantly on the bicycle results in the scratching and marring of the highly decorative chrome or painted finish of the bicycle, this being quite undesirable as the frame of the bicycle is then stripped of its protective coating with the metal of the frame beneath the coating being exposed to the weather for rusting, corrosion, and other undesirable effects.

SUMMARY OF THE INVENTION

The invention recognizes the popularity of bicycle riding and the need of ease of transportation of such bicycle, such as by an automobile or the like, between locations of desired use, such as bicycle trails or the like, and provides a novel solution permitting ease of assembly and removal of the handle bars from the bicycle frame for ease of storing the bicycle in a limited area for transport, such as the trunk of an automobile, the back automobile seat portion, and the like.

This invention permits the bicycle to stand upright by the use of the conventional kickstand while the handle bar is being removed in preparation to place the bicycle in an automobile trunk. This is an advantage over the folding bike because the bike can stand by itself on the kickstand. Then the bike is lifted into the trunk for transport or storage whereas the folded bike is awkward to handle while being placed into the trunk of a car.

It is a feature of the present invention to provide a bolt for holding the handle bars to the steering wheel portion of the bicycle frame with the bolt having a head portion readily grasped in the hand of an individual in a manner to effect a tightening or loosening rotative movement thereto for securing or removing the handle bars therefrom.

A further feature of the present invention provides for the ease of removal of a handle bar from the associated front steering wheel of a bicycle in a manner to prevent the theft or unauthorized use of the bicycle as the bicycle may be stored in the trunk of an automobile while the owner is away with the bicycle safely stored in the trunk of the automobile.

Yet still a further feature of the present invention provides a device for removably fastening handle bars to a bicycle steering wheel and which is relatively simple in its construction and which therefore may be readily manufactured at a cost comparable to the cost of presently utilized handle bar bolt assemblies, such manufacturing being accomplished by simple readily available manufacturing methods.

The present invention provides the advantage of removably securing handle bars on a bicycle frame and permitting the removal of the handle bars for purposes of transport and storage of the bicycle, this eliminating the necessity of car top racks for transporting the bicycle; allowing the bicycle to be readily placed in the trunk of an automobile when the handle bars are removed therefrom; protects the bicycle from possible theft or vandalism during transport since it is hidden out of view in the automobile trunk rather than being transported in a readily viewable manner on the back or top of the automobile; and permits ease of reassembly of the bicycle at the desired locations without requiring any tools or special expertise or skills, such reassembly being rapid and requiring little laborious labor.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a fragmentary perspective view of a bicycle having the handle bars fastened thereto by use of the fastening device of the present invention;

FIG. 2 is a side elevational view of the steering post assembly of a bicycle having the handle bars secured to the steering wheel by use of the fastening device of the present invention;

FIG. 3 is a fragmentary front elevational view of the handle bar steering post with the bolt of the present invention inserted thereinto, and FIG. 4 is an exploded fragmentary perspective view of the handle bar steering bracket and the bolt of the present invention.

DESCRIPTION OF THE PREFERRED EMBODIMENT

Referring now to the drawings in detail there is illustrated a typical two-wheel bicycle 10 having a back wheel 11, a front steerable wheel 12 which is journaled at its axis in a conventional manner to a fork 13 which terminates at its top end in a member 14 having a hollow tubular post 15 projecting upwardly therefrom, the post 15 being axially inserted into and rotatably received in a hollow tubular stem 18 which is connected in a conventional manner to bicycle frame members 19, 20 and 21.

The handle bars 22 are of a conventional configuration formed of an elongated tube bent to the desired configuration and having handle gripping portions 23 disposed at opposite ends thereof, the midpoint of the handle bars connected by a bracket 24 which includes an elongated cylindrical stem 25 having a radial projecting member 26 projecting outwardly from the side wall thereof adjacent the top end 27 of the stem with the end 28 of the member 26 doubled over onto itself about the handle bars 22 and secured in position about the handle bars by a threaded bolt 29 secured by nut 30. The stem 25 of bracket 24 includes an elongated cylindrical bore 31 projecting axially therethrough and adapted to receive therethrough a bolt like member 40 having a threaded end portion 54 adapted to threadingly engage a threaded bore 60 of wedge member 61 having a base 62 and a tapered wedging leg 63 projecting upwardly from the base and adapted to act against inclined edge 64 of stem end portion 32 in a wedge like manner. The bracket 24 being rotatably supported on the top end 32 of tubular stem 18 by conventional type thrust bearing 35 in the conventional manner.

To removably secure the bracket 24 to the post 15 when the same are both inserted into the stem 18 in operative relationship relative to each other, such as seen in FIG. 2, there is provided the bolt like member 40 having a head portion 41, a collar portion 42, and a shank portion 43. The head portion 41 is in the form of a segment of a disc having a semi-circular pair of front and back faces 44 and 45 interconnected along their peripheral curved arcuate surfaces by a curved surface 46 which terminates at ends 47 and 48 which are then joined together by a substantially flat rectangularly configured bottom surface 49. The collar member 42 is formed integral with the head portion 40 and is in the form of an elongated cylindrical member having the top end formed integrally with the bottom surface 49 and centrally thereof with the collar member extending outwardly therefrom to terminate at projecting end 50. The shank 43 is formed integrally and concentric with the collar member 42 and has a top end 51 disposed adjacent the free end 50 of the collar member with the shank having an elongated cylindrical rod like body member 52 projecting axially from the collar member and terminating at end 53, the circumferal portion of the shank adjacent end 53 including screw like threads 54 thereabout, such threads being of a size and pitch complementary to those threads disposed in threaded bore 60 in wedge member 61.

The handle bar is assembled complete with wedge member 6 threadedly joined as shown in FIG. 3. In operation, the complete assembly of the handle bar is inserted into the bore of member 15 and the bolt 40 is rotated to pull up wedge 61. As wedge 61 is pulled up by the thread action of 54 in threaded bore 60 in wedge member 61, the wedging action fastens the handle bar stem 25 to the bore of member 15. To remove the handle bars from the bicycle 10 it is only required that an individual grip the head portion 41 and rotate the same in a direction to unthread the wedge member 61 slightly, then tap the head portion 41 lightly to force the wedge 61 downward thus loosening the fastening action between the wedge 61 and the bore of member 15, this permitting the removal of the handle bars from the bicycle.

There is thus provided a handle bar fastening device for a two-wheel bicycle permitting the handle bars to be assembled to the bicycle and readily removed therefrom in a fast and expedient manner without requiring the use of any tools whatsoever.

It is to be understood that the form of this invention herewith shown and described is to be taken as preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A device for detachably attaching a handle bar to the frame of a two-wheel bicycle having a front wheel and a back wheel, the front wheel journaled about its axis to a fork terminating at its top end in a post, a hollow tubular stem mounted on the bicycle frame and adapted to rotatably receive the post in the bottom end thereof, a bracket adapted to be secured at one point to the midpoint of the handle bars with a portion of the bracket defining a cylindrical stem adapted to project inwardly of the hollow tubular frame stem and engage the post, a wedging member having a base with a cylindrical threaded bore therein and having a wedging leg projecting upwardly therefrom adapted to wedgingly engage the bottom portion of the cylindrical leg, the cylindrical stem having a bore extending axially therethrough and disposed in alignment with the threaded cylindrical bore of the wedging member, the fastening device comprising:

a bolt member having an enlarged head portion, a collar member depending from the head portion, and a shank depending from the collar member, threads disposed about the circumference of the shank adjacent the terminal end portion and adapted to threadedly engage the threads in the threaded cylindrical bore of the wedge member, and the head portion adapted to be grasped in the hand of an individual in a manner to effect a rotating force thereon in a first direction about the shank axis to effect the threaded engagement of the threaded cylindrical bore to fasten the handle bars to the bicycle frame, and rotatable in an opposite direction about the shank axis to effect the removal of the handle bars from the bicycle frame, the head portion of the bolt member includes a pair of opposed semi-circular front and back surfaces, the peripheral curved edges of the front and back surfaces interconnected by a smooth longitudinally arcuately concave curved surface, and a flat elongated rectangular bottom surface interconnecting the end portions of the curved top surface.

2. The fastening device as set forth in claim 1 wherein the collar member comprises an elongated cylindrical member formed integrally with the head portion and having one end connected thereto with the opposite end projecting outwardly therefrom normal to the plane of the bottom surface, and the collar member being disposed centrally of the bottom surface.

3. The fastening device as set forth in claim 2 wherein the shank member is formed integrally with the collar member and concentric therewith, one end of the shank member connected to the projecting end of the collar member, and the shank including a cylindrical rod like body member extending between the end portions of the shank with the body member being of a diameter to engage the threaded cylindrical bore in the wedging member.

4. The fastening device as set forth in claim 3 wherein the collar member is of a larger diameter than the shank member, the point of joining of the shank member to the collar member defining an annular shoulder thereabout, and the annular shoulder adapted to rotatably engage the top surface of the cylindrical stem of the handle bar bracket to support the bolt member in operative position therein.

* * * * *